Figure 9:
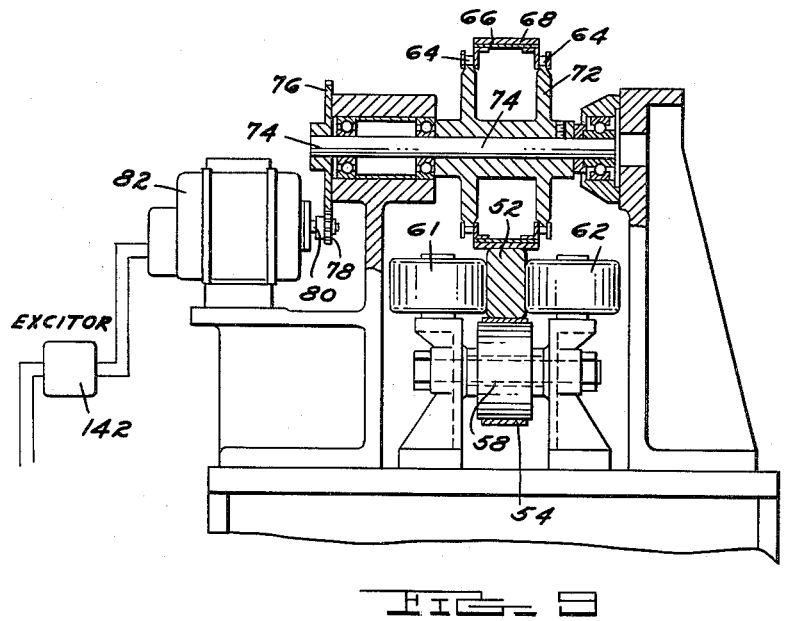

March 27, 1962 L. P. GAJDA ETAL 3,026,594
METHOD AND APPARATUS FOR PRESSING SOAP
Filed Dec. 18, 1958 10 Sheets-Sheet 1
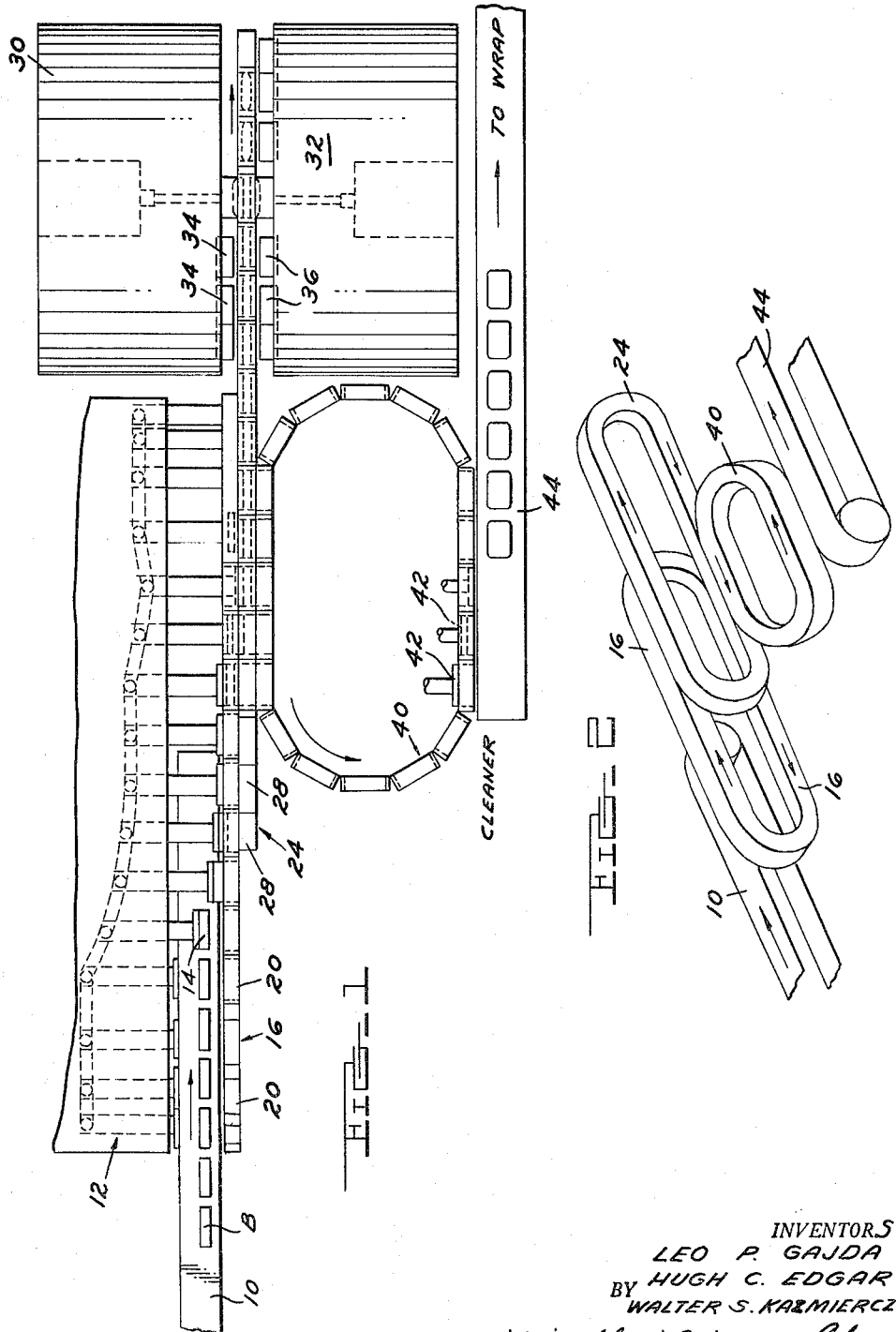
INVENTORS
LEO P. GAJDA
HUGH C. EDGAR
WALTER S. KAZMIERCZAK
BY Barnes, Kisselle, Raisch & Choate
ATTORNEYS

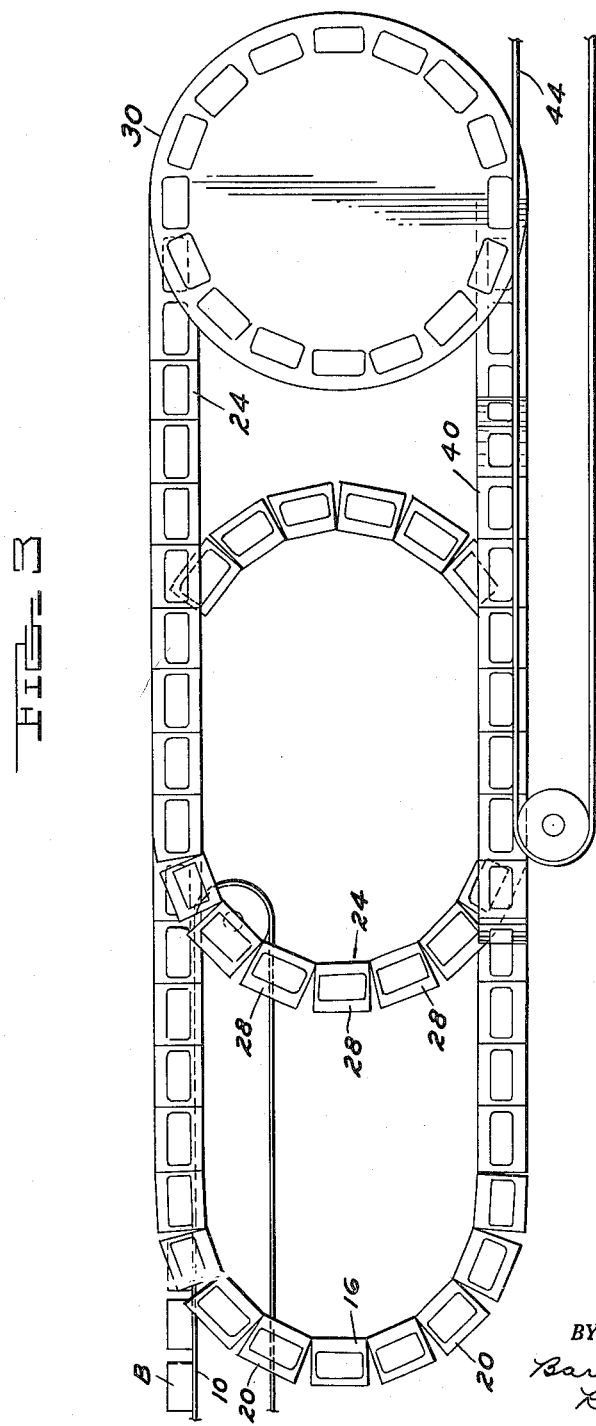

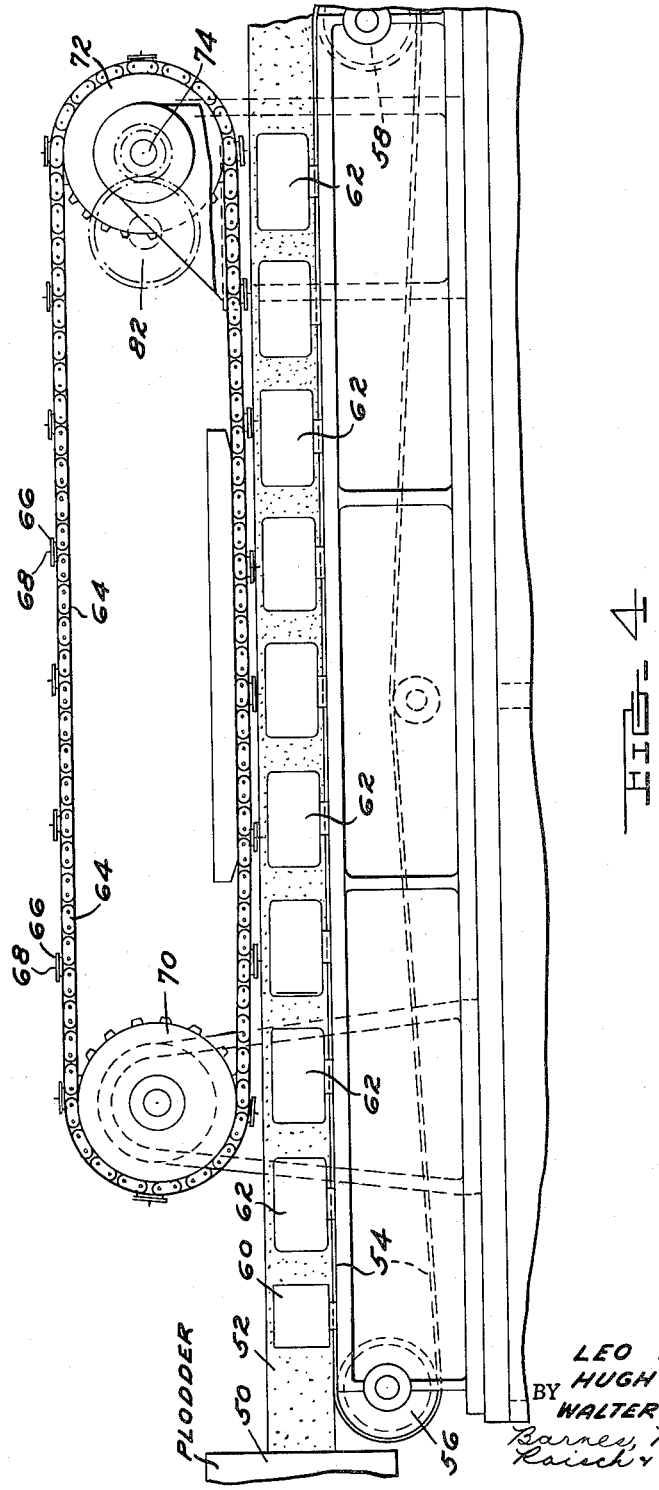

March 27, 1962 L. P. GAJDA ETAL 3,026,594
METHOD AND APPARATUS FOR PRESSING SOAP
Filed Dec. 18, 1958 10 Sheets-Sheet 4
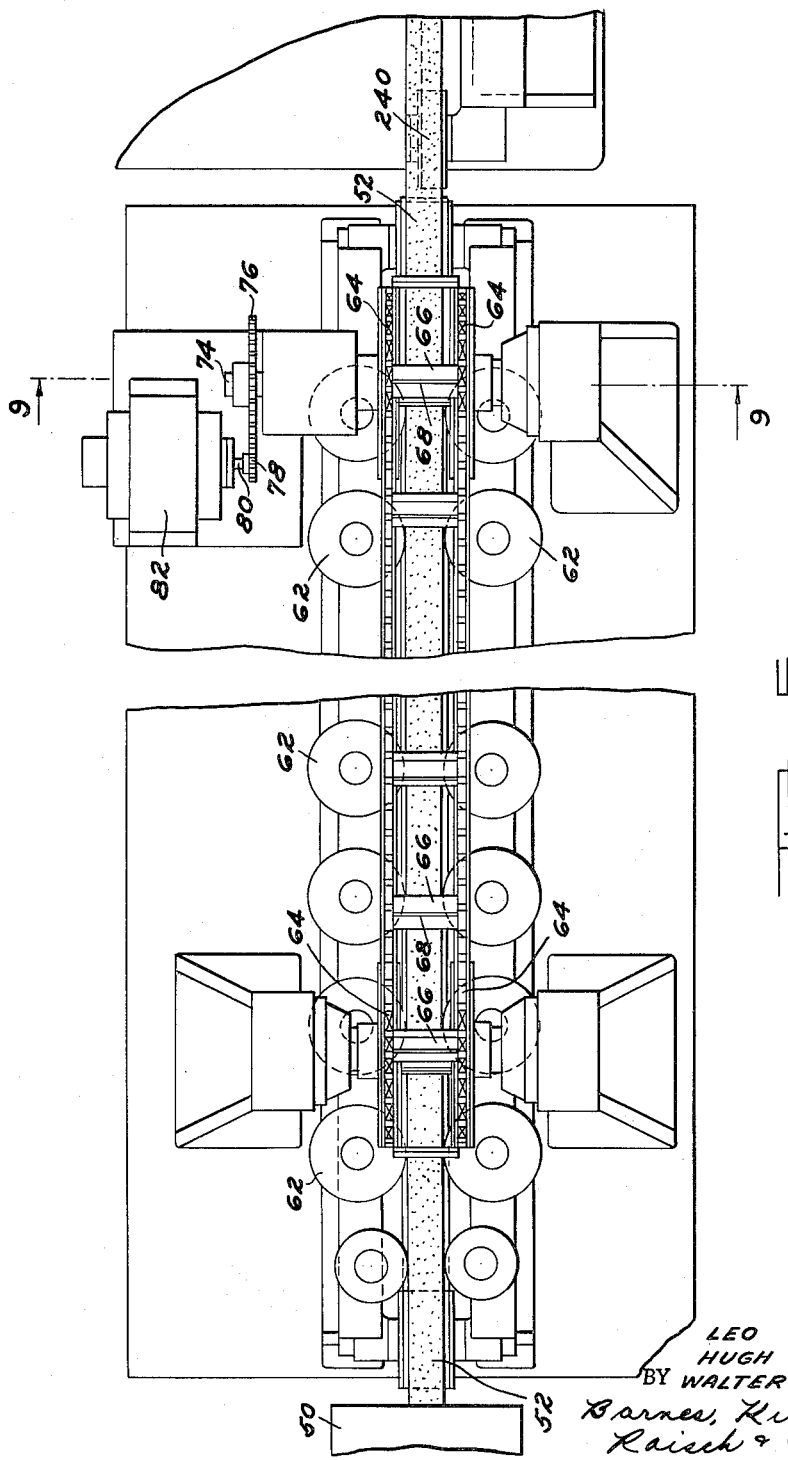
INVENTORS
LEO P. GAJDA
HUGH C. EDGAR
WALTER S. KAZMIERCZAK
BY Barnes, Kisselle,
Raisch & Choate
ATTORNEYS

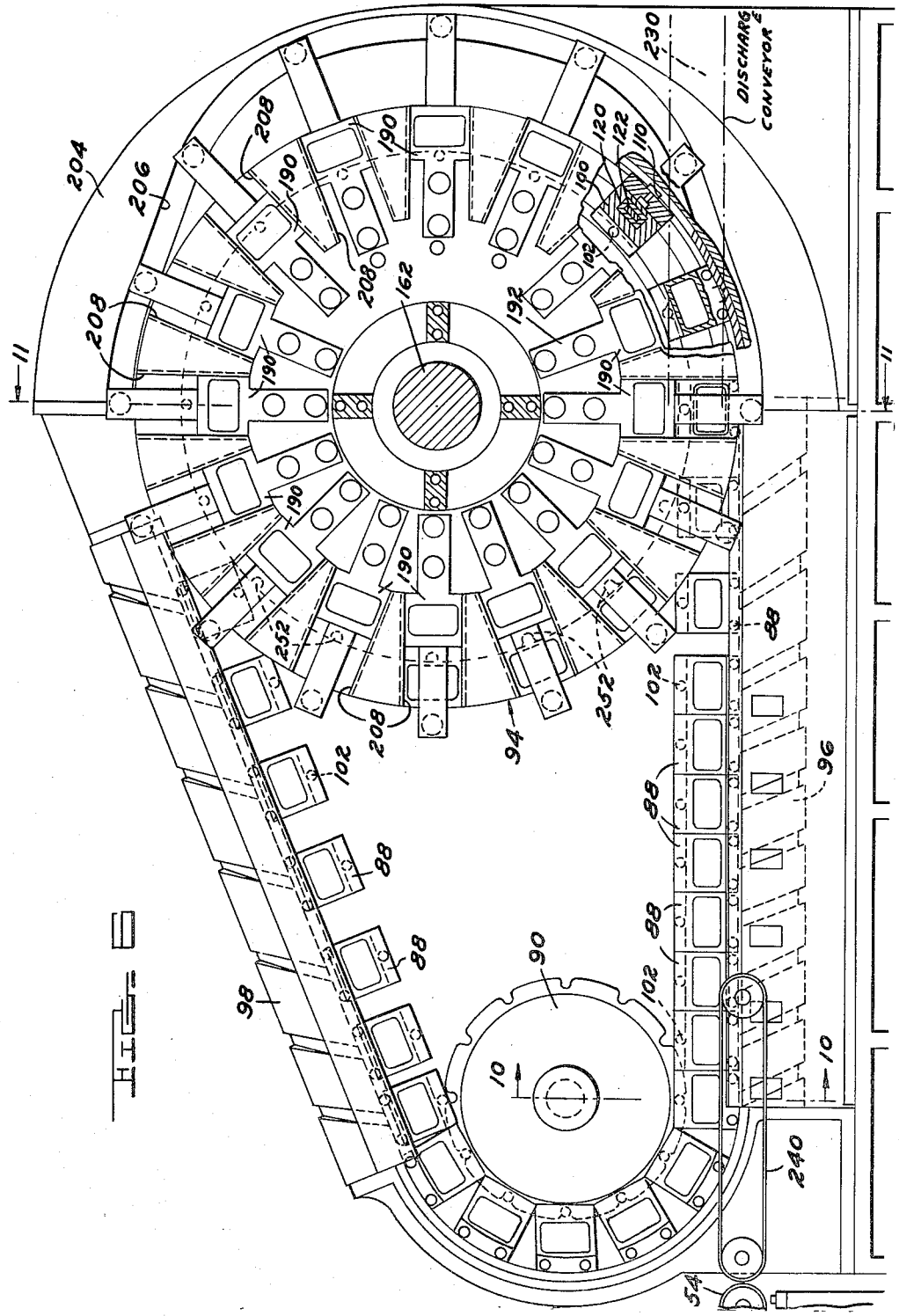

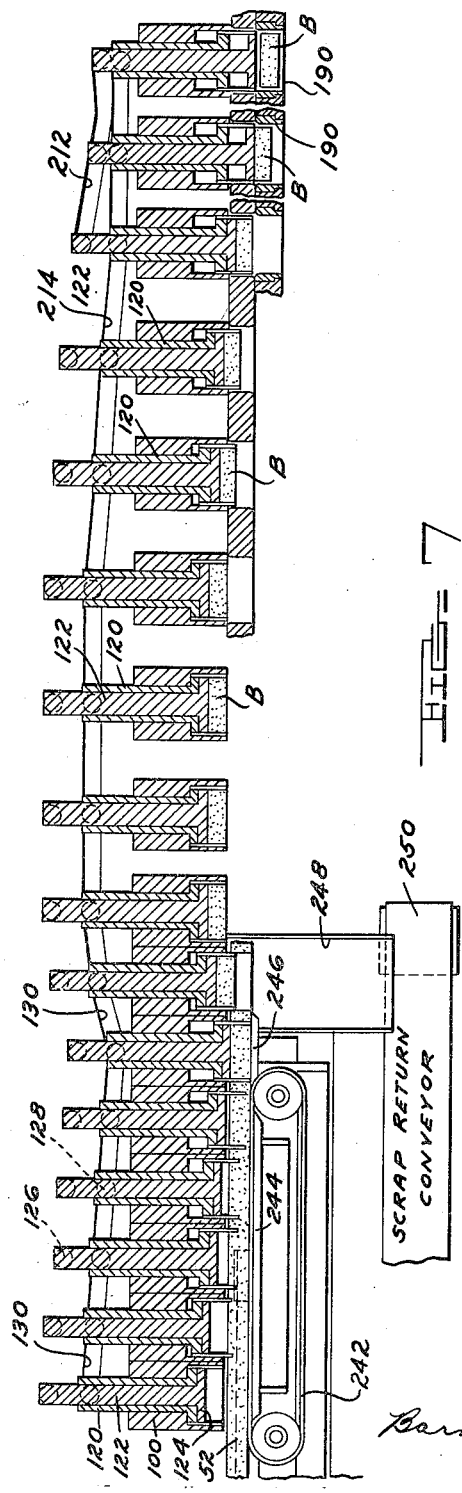

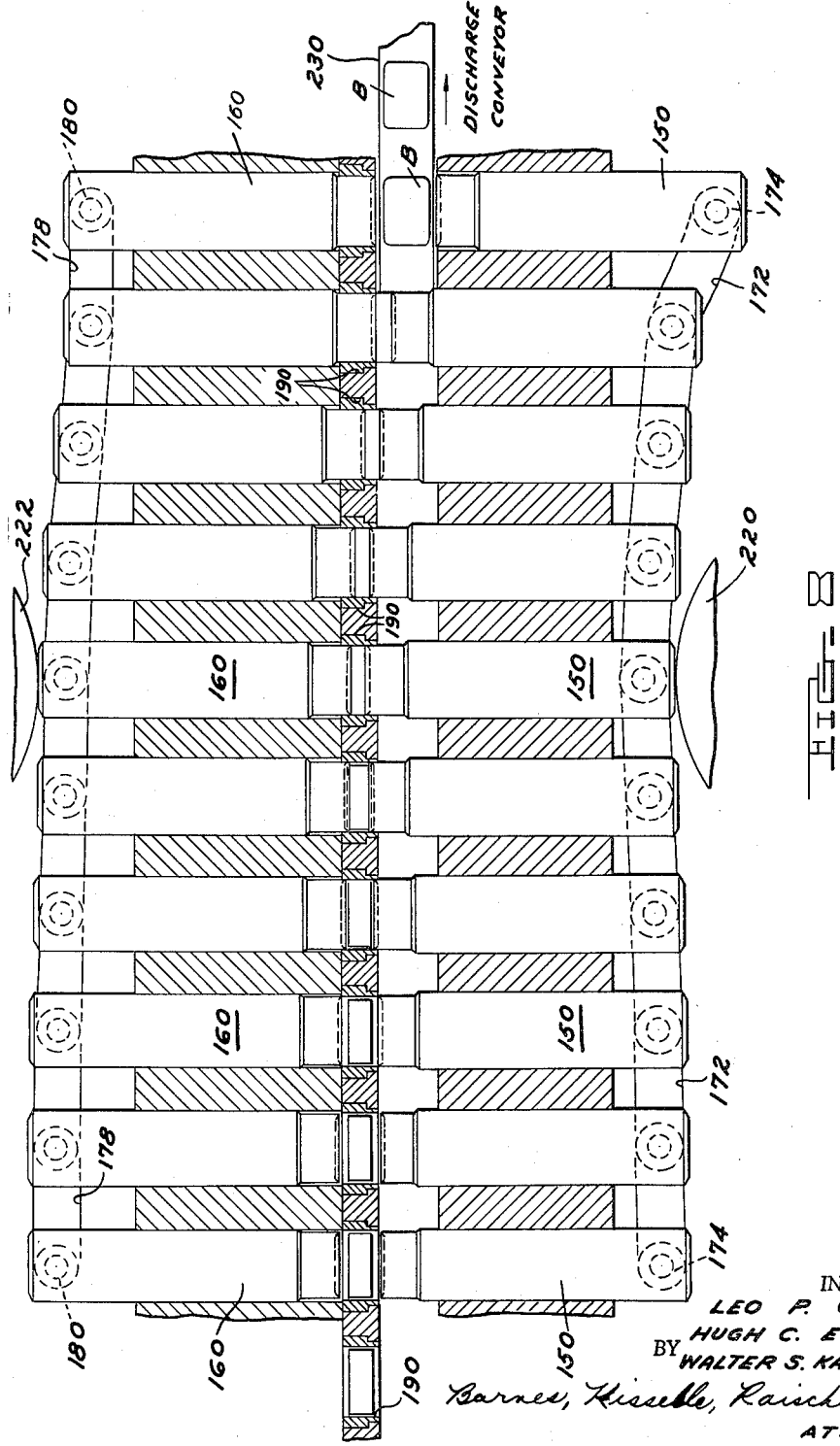

March 27, 1962 L. P. GAJDA ETAL 3,026,594
METHOD AND APPARATUS FOR PRESSING SOAP
Filed Dec. 18, 1958 10 Sheets-Sheet 8

INVENTORS
LEO P. GAJDA
HUGH C. EDGAR
BY WALTER S. KAZMIERCZAK

Barnes, Kisselle, Raisch & Choate,
ATTORNEYS

March 27, 1962 L. P. GAJDA ETAL 3,026,594
METHOD AND APPARATUS FOR PRESSING SOAP
Filed Dec. 18, 1958 10 Sheets-Sheet 9

INVENTORS
LEO P. GAJDA
HUGH C. EDGAR
BY WALTER S. KAZMIERCZAK

Barnes, Kisselle, Raisch & Choate
ATTORNEYS

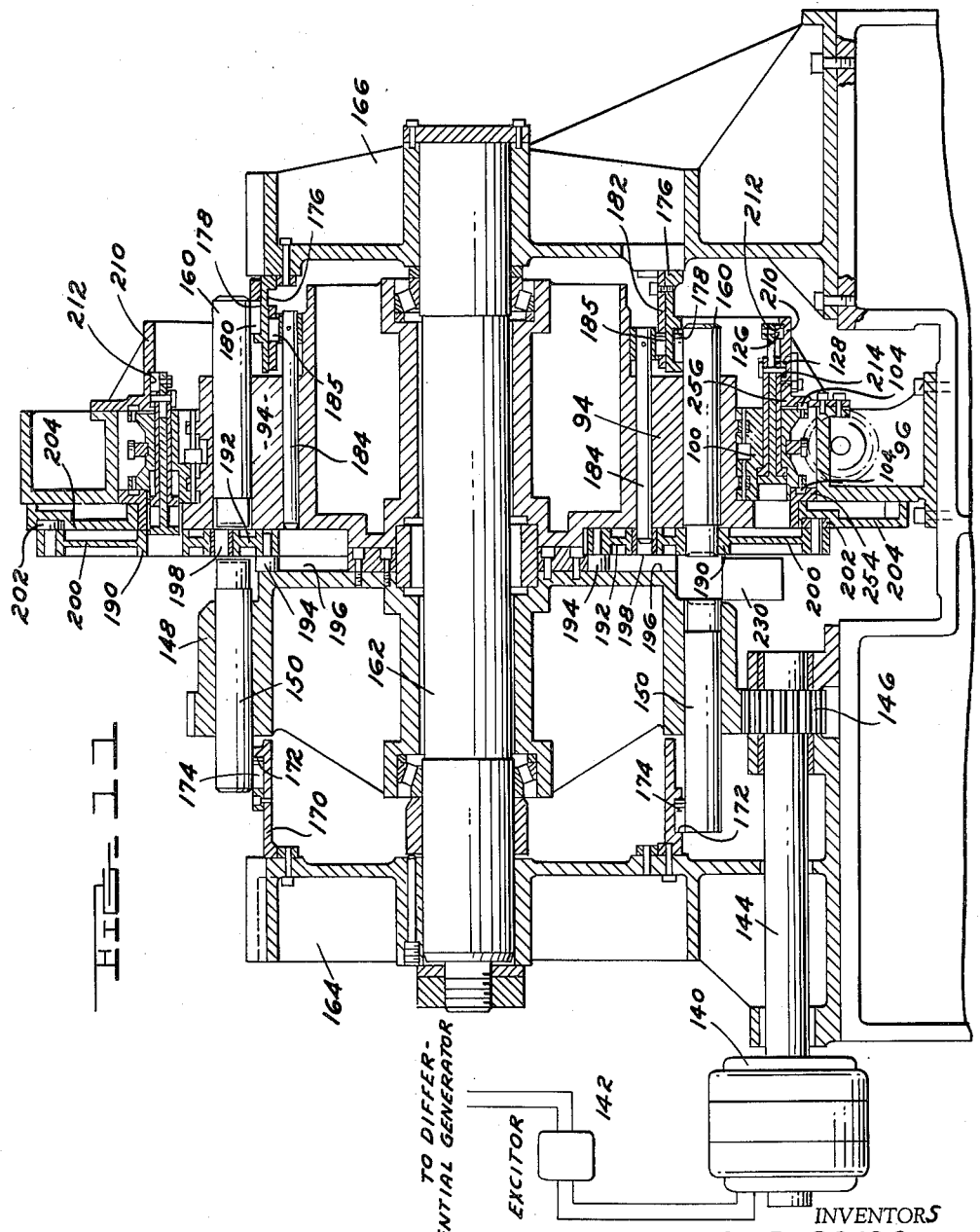

United States Patent Office 3,026,594
Patented Mar. 27, 1962

3,026,594
METHOD AND APPARATUS FOR PRESSING SOAP
Leo P. Gajda, Hugh C. Edgar, and Walter S. Kazmierczak, Detroit, Mich., assignors to Arthur Colton Company, Detroit, Mich., a corporation of Michigan
Filed Dec. 18, 1958, Ser. No. 781,229
21 Claims. (Cl. 25—7)

This invention relates to the manufacture of soap bars.

It is an object to provide a new method and apparatus for the formation of soap bars with the purpose of giving the bars any desired contour and also impressing them with any name or trademark which is desirable.

The present-day methods of manufacturing soap use for the most part intermittent operations similar to a punch-pressing operation, and the capacity of any one machine is definitely limited with this type of action. Another problem in connection with the manufacture of soap is the prevention of marring or damage to the soap as it is pressed, since it is desirable, particularly with hand soap, that it reach the consumer in as near perfect condition as possible.

It is an object of the present invention to provide a continuous method and machine for the manufacture of soap bars with the idea that the speed of manufacture can be greatly increased without adversely affecting the quality and, in fact, with an improvement of quality.

It is an object of the present invention to provide a machine which can accept soap either in cut blanks or in a continuous extruded strip coming from a plodder, the machine being so designed that it can operate at different speeds depending on the rate of production of the raw soap.

It is a further object to provide a soap machine which carries the bar blanks in a continuous path while moving them from trimming devices into die pockets and out of die pockets onto a discharge conveyor without interruption of the motion and without damage to the completed bars.

Other objects and features of the invention relate to details of the trimming devices, the conveying device for the devices, and the mechanism for moving the die pockets into die forming plungers relative thereto.

Other objects and features of the invention will be apparent in the following description and claims.

Drawings accompany the invention, and the various views thereof may be briefly described as:

FIGURE 1, a plan view of the device showing the general outline of the apparatus.

FIGURE 2, a diagrammatic presentation of the various elements showing the path of motion.

FIGURE 3, a side elevation of the device as shown in FIGURE 1.

FIGURE 4, a portion of a second apparatus for molding bars showing the timing section.

FIGURE 5, a top view of the timing section shown in FIGURE 4.

FIGURE 6, the trimming and forming section of the second apparatus.

FIGURE 7, a partial development of the trimming and forming section.

FIGURE 8, the remainder of the development of the trimming and forming section.

FIGURE 9, a sectional view on line 9—9 of FIGURE 5.

Figure 10:
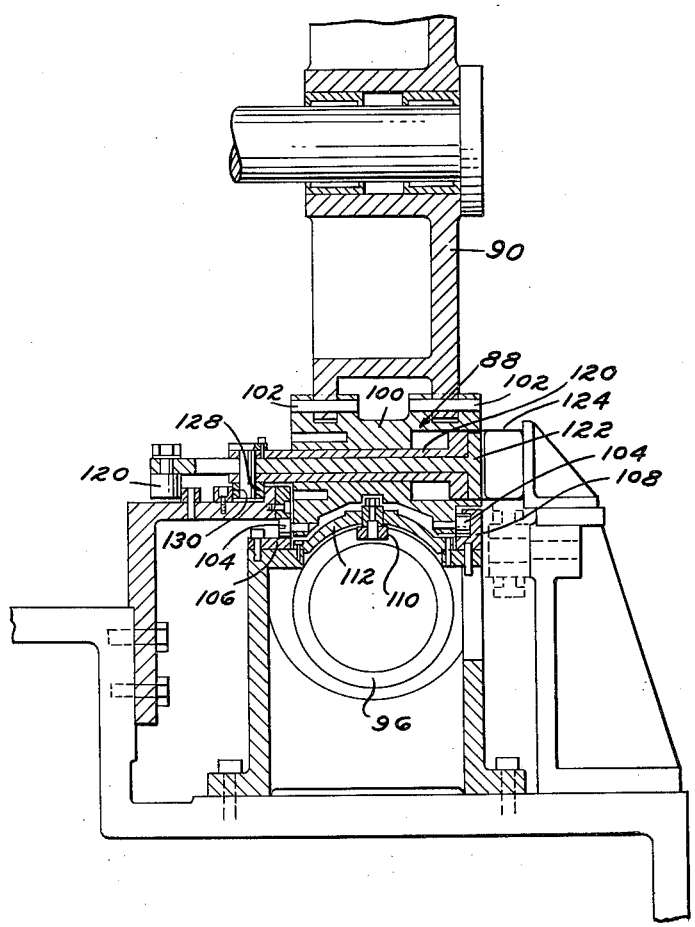

FIGURE 10, a sectional view on line 10—10 of FIGURE 6.

FIGURE 11, a sectional view on line 11—11 of FIGURE 6.

Referring to the drawings, in FIGURES 1 to 3, a feed belt 10 brings the raw soap bars from whatever source they are provided. In modern soap methods, these are frequently formed by extrusion and cut off in predetermined lengths. It is necessary then to form this soap while it is still in a soft state into the shape desired.

The bars B pass in front of a bank 12 of pusher plates 14 which rotate in a curvilinear path following the belt and engaging the soap bars continuously to move them into a trimmer conveyor 16. The trimmer conveyor consists of a plurality of separate blocks 20, each of which is provided with a straight-through opening for trimming the soap bar into contour. The bars are pushed from the belt 10 into the trimmer conveyor 16 by the moving plates 14. Most of the soap which is trimmed off will fall off the belt 10 into a proper receptacle at the end of the belt.

After the trimming operation, the plates 14 continue to push the bars through the openings in the trimmer plates 20 into a form conveyor 24 having a plurality of blocks 28, each with a straight-through opening the shape of the bar. The pusher plates feed the trimmed bars into these openings and then withdraw from the recesses in the conveyor 16.

The conveyor 24 carries the bars in a plane between two rotating drums 30 and 32 revolving in synchronism with each other and with the conveyor 24. These drums contain mold blocks 34 and 36 for opposite sides of the soap bars, and these mold blocks are cammed into the recesses to give a final compression to the bar and a shaping of the sides. This shaping can take place throughout the 180° of revolution from the top opening to the bottom opening as shown in FIGURE 3, after which the bars will be carried away from the drums 30—32 to the lower run of the conveyor 24, where they parallel for a time a conveyor 40 operating on a vertical axis.

The pusher plates 14 on their bottom run can be cammed into the openings of conveyor 24 to move the completed bars into the individual pockets of conveyor 40, and ejector plates 42 can then move the completed bars out onto a horizontal conveyor belt 44.

It will be seen with the above method and apparatus that the trimming is accomplished ahead of the pressing operation with a time delay between the two. The soap shavings from the trimming are, therefore, kept away from the press; and they prevent impressions in the soap which mar the finish.

The soap finishing is also accomplished without moving the soap over any dead plate areas which would tend to mar the finish, and the bars are completely separated from each other right up to the time of packaging.

The whole operation is controlled and continuous so that it can be moved at a rapid rate to increase the production of soap-producing factories. The trimmer blocks in conveyor 16 can be washed thoroughly before receiving fresh bars of soap so that they are always clean and effective in the initial trimming operation. All transverse movement of the bars is held to a minimum which is approximately the thickness of the soap.

A modified apparatus designed for rapid operation and automatic control is illustrated in FIGURES 4 to 11. All parts are synchronized electrically in a manner to be described.

The action originates in a plodder 50 from which is extruded a continuous rectangular ribbon of soap 52. The rate of extrusion is not constant and therefore a means of regulating the speed of the press, trimmers, etc., must be provided to synchronize with the output of the plodder.

The soap rides out on a belt 54 supported on pulleys 56 and 58. A brine lubricator 60 is provided and also side-guide rollers 62 for the soap. A double timing chain 64 provided with spaced bridging plates 66, each bearing a blade 68, moves on pulleys 70 and 72 (FIGURE 4).

Pulley 72 is mounted on a shaft 74 suitably journaled and has on the end thereof a driven gear 76 meshed with a gear 78 on shaft 80 of a Telesyn differential generator 82.

The knife-like blades 68 imbed in the ribbon of soap and move the timing chain at the same linear speed. The chain operates a differential generator which is electrically associated with an exciting capacitor and a generator. The generator operates from a press to be described and both the differential generator and the generator are to make one revolution per bar of soap. The generator, through the excitor, controls the speed of a direct current motor. As long as the linear speed of the extruded soap is constant, the angular relation of the generators remains on a so-called O line. But should the linear speed of soap increase or decrease, the differential generator will signal through the excitor to increase or decrease the speed of the press, thereby maintaining synchronism of the press.

In FIGURE 6, the soap bar formation continues in a press which combines a cutting action and a shaping or molding action. A plurality of trimmer boxes 88 are carried in a continuous path around a sprocket wheel 90 at one end and a sprocket wheel 94 at the other end. These boxes 88 are moved between the sprockets by a trimmer box feed drive cam 96 at the bottom and return drive cam 98 at the top.

Each box 88 comprises a housing body 100, FIGURE 10, with spaced runs at the top, each grooved to receive a flange of the sprocket wheels 90, 94 and carrying pins 102 to engage notches in the wheels. The lower side of each box is provided with side projecting rollers 104 which ride on rails 106 and 108, respectively. Between these rollers a pin roller 110 projects downwardly to engage the grooves of cam drive rolls 96 and 98. A guide plate 112, FIGURE 10, has a slot to guide these rollers during a portion of the straight travel.

Transversely mounted in each trimmer box 88 is a double plunger consisting of an outer plunger 120 which mounts and guides and inner plunger 122, the latter having a rectangular trimmer knife 124. Each plunger has a roller cam follower 126 and 128, respectively. In FIGURE 10, the roller 128 is guided in a cam groove 130 shown also in FIGURE 7. The function and shape of the cam groove will be described later in connection with the sequence of operation.

The press wheel and sprocket 94 is shown in FIGURES 6 and 11. The wheel is driven by a D.C. motor 140 controlled by the excitor 142 and the differential generator 82 referred to previously. The motor drives a shaft 144 on which is mounted a gear pinion 146 driving the large gear 148 of the sprocket which forms one half of the press, this gear having mounted thereon a plurality of plungers 150, mounted to oppose plungers 160 in the sprocket wheel 94 previously referred to. These two plunger mounting wheels are mounted together for rotation on a horizontal shaft 162 suitably mounted at each end at brackets 164 and 166.

The plungers 150 are controlled by a cam ring 170, the cam ring having a track 172 which engages followers 174 attached to the plungers, the cam ring being fastened to the bracket 164. Mounted on bracket 166 is a similar cam ring 176 having a cam groove 178 to receive the follower portions 180 on the plungers 160. Also mounted on the cam ring 176 is an inner cam ring 182, having a suitable cam track for actuating shot bolts 184 through followers 185. The purpose of these shot bolts is to locate a plurality of die pockets 190 shown best in FIGURES 6 and 11. These die pockets have inner and outer radial projections, the inner projections 192 having a cam roller 194 acting in a guide track 196, FIGURE 11, the inner extensions 192 also having an opening 198 to receive the shot bolt 184 in a locating position as shown at the bottom of FIGURE 11. The die pockets 190 also have an outer projection arm 200 on which is mounted a follower roller 202 which moves in a cam flange 204 mounted outside the plunger wheel 94. This cam flange has a groove 206 shown in FIGURE 6 for shifting the die pockets 190 radially in the guide slots 208.

Another cam control is provided, as shown in FIGURE 11, in the form of a flanged cam ring 210, this ring having a cam groove 212 for engaging the follower 126 on the inner plunger 122 of the trimmer box 88 and a second cam groove 214 for engaging the cam follower 128 on the outer plunger 120 of trimmer box 88.

Shown diagrammatically in FIGURE 8 is a pair of rollers 220 and 222 for putting pressure on the respective plungers 150 and 160 at the climax of the molding operation in the press wheel. Also shown in FIGURES 8 and 11 is a discharge conveyor 230 which takes the completed cakes away from the forming machine.

*The Operation*

The operation with respect to the conveyance of the extruded length of soap 52 as shown in FIGURE 4 and in conjunction with the timing chain 64 will be fairly clear from the previous description. As this length of soap 52 passes from the conveyor support 54 to a conveyor support 240, the cam groove 130 (see FIGURE 7) begins to move the outside plungers 120, and consequently the inside plungers 122, forward from the trimmer boxes 88. The rectangular knife 124 cuts into the soap progressively as shown in FIGURE 7 until it passes through the soap. The extruded strip of soap 52 is backed up by a moving conveyor belt 242, one side of which is supported by a blade 244. The trimmer knife finally stops its transverse travel against a blade 246 and the assembly is then retracted by a change of angle of the groove 130 so that the bar which has been cut out of the soap strip is returned into the trimmer box. Meanwhile, the portions of the soap strip which are outside the cut bar are discharged into the chute 248 and carried back into the plodder by a scrap return belt 250. The bar is then carried in the trimmer boxes by the motion of the bottom cam 96.

As shown in FIGURE 6, the trimmer boxes 88 are closely spaced at this phase of the operation by the action of the carrying cam 96. As the boxes approach the rotating press, they become more widely spaced by the cam groove of the cam 96 such that they will register with the sprocket notches 252 on the sprocket wheel 94 shown in dotted lines in FIGURE 6.

The trimmer boxes ride up into the press on suitably flanged groove rings 254 and 256 mounted around the sprocket 94. They are carried in registry with the die pockets 190 by the sprocket notches 252 which engage the rollers 102.

As shown diagrammatically in FIGURE 7, as the trimmer boxes ride up in the sprocket wheel, the outer plungers 120 are moved forward into openings in the sprocket and at a predetermined point the inner plungers 122 are moved forward relative to the outer plungers 120 to move the bars B from the cutting knives into the die pockets 190. After this motion, the plungers are retracted; and as the trimmer boxes reach the top of the travel on the wheel, they are again moved into a lineal path when engaged by the rotating return cam 98, the trimmer boxes moving in a return path to engage the sprocket 90 and return to the cycle. In the meantime, after the loading of the bars into the die pockets 190, the cam groove 206 engaging the outer arms of the die pockets moves the die pockets to an inward position as shown adjacent the top of the die press in FIGURE 6. Shortly after reaching this point, the shot bolts 184 are cammed into the holes 198 and the die pockets are locked in position.

The cam grooves 172 and 178 shown diagramatically in FIGURE 8 are then acting on the plungers 150 and 160 to move them inwardly against the bar. Each plunger is shaped at its end to provide a proper contour recess for the outer surface of opposite sides of the bar and provided with any suitable marking indicia which is desired. The soap, which is still in formable condition, is thus shaped into a bar and finally compressed by resliently mounted rollers 220, 222 as shown diagrammatically in FIGURE 8. Then the entire assembly starts moving together as shown in FIGURE 8, that is, the die pocket, the two plungers, and the compressed bar, until the bar is out of the die pocket, and overlying the discharge conveyor 230. The cams then rapidly separate the plungers, and the bar is deposited directly on the conveyor where it can be taken to a wrapping station. The plungers are then retracted to the position shown in the left-hand end of FIGURE 8 so that the cycle may move forward in a continuous process.

As previously described, the timing chain 64 is moved by the extruded soap strip at a predetermined rate and the press is accordingly rotated through the direct current motor 140 to conform to the rate of extrusion. The marks of the blades which drive the chain 64 are removed in the scrap soap so that the bar which is ultimately formed is not scarred.

We claim:

1. In a continuously operating machine for molding soap bars, a means for extruding a strip of unmolded soap to provide a plurality of blanks for soap bars, means for conveying said extruded strip in a lineal path, means for cutting bar blanks from said strip comprising a backing means for moving along one side of said strip and a plurality of trimming and conveying boxes for cutting out bar blanks and moving said blanks to forming dies, each of said boxes comprising, a body support, a trimmer plunger comprising a first piston mounted for transverse sliding action in said body and having at one end a closed knife formation for moving into said extruded soap and a second piston mounted for sliding motion within said first piston for ejecting a bar blank from said closed knife, guide means for supporting said trimmer boxes for movement in a continuous closed path, operating means for said trimmer boxes for moving them in said path comprising spaced sprockets having means for engaging said trimmer boxes and moving said boxes around the periphery thereof and longitudinally extending cam means for propelling said boxes along said guide means between said sprocket means in a path substantially tangential to said sprockets, one of said sprockets having a plurality of die pockets mounted thereon and movable radially thereof from a path wherein said die pockets are in registry with said trimmer boxes to a path wherein said die pockets are out of registry with said trimmer boxes, and cam means for operating said pistons relative to each other positioned adjacent the path of registry of said die pockets and trimmer boxes wherein bar blanks carried within said closed knife portions of said first piston may be ejected by said second piston into said die pockets.

2. A method of finish pressing soap bars in a continuous process from the crude blanks, which comprises, passing the blanks into an edge-forming die to trim the periphery of the blanks, transferring the edge-forming die with the blank therein to a point clear of the trimming operation, confining the periphery of the blank with a smooth continuous surface by moving the trimmed blanks into the side of a peripherally encircling carrying die, passing forming dies into said carrying die from each side to exert simultaneous pressure on said trimmed blanks to shape the sides of the bar and moving the shaped bars from one of the sides of the carrying die onto a discharge conveyor.

3. The method of operating a soap bar forming machine to form soap bars continuously, which machine has a feed belt, a discharge belt, a series of continuously moving trim dies, a series of continuously moving carrying dies, and a series of continuously moving forming dies and a plurality of continuously moving pushers for moving soap bars into and out of said dies, which method comprises, carrying a plurality of rough soap blanks alongside a portion of the trimming dies, pushing the blanks through the trimming dies into the carrying dies with the moving pusher elements, exerting pressure on the sides of the bars while they are in the carrying die by the moving forming dies, and moving the bars out of the carrying die after the forming operation by utilizing the moving pushers which parallel the path of the carrying dies at a discharge spot adjacent the discharge belt.

4. The method of operating a soap bar forming machine to form soap bars continuously, which machine has a feed belt, a discharge belt, a series of continuously moving trim dies, a series of continuously moving carrying dies, a series of continuously moving forming dies and a series of continuously moving pushers, the path of said belts, dies and pushers paralleling each other in certain portions to permit transverse movement of bars from one to the other, which method comprises, moving raw soap blanks alongside the trimming dies, pushing the soap blanks through the trimming die into the carrying die, forming the exposed opposite sides of the bar while in the carrying die with the forming dies throughout a portion of the path of the carrying die and discharging the finished bars from the carrying die by utilizing the pushers which parallel a portion of the carrying die adjacent the discharge belt.

5. A method of finish pressing soap bars which comprises, extruding a continuous length of soap having a dimension greater than the proposed bar, cutting from said continuous strip a plurality of bar blanks, moving the bar blanks into the side of a periphery encircling carrying die at a point clear of the cutting operation, passing forming dies into said carrying die from each side to exert simultaneous pressure on said blanks to condition the surface thereof, and moving said shaped bars out of one of the sides of the carrying die by confining the shaped bar in said forming dies while the forming dies are both moved in the same direction relative to the carrying die and subsequently discharging said bars on to a discharge conveyor by relative opening movement of the forming dies when the bar is over said discharge conveyor.

6. A continuously operating machine for molding bars from an extruded material which comprises, means forming a plurality of hollow one-piece die boxes having a smooth walled cavity extending therethrough to provide a plurality of open-ended and peripherally closed die pockets, moving trim means to form bar blanks, means to shift said moving bar blanks into one of the open ends of said peripherally closed die pockets, means to move said die pockets as they receive said blanks, moving forming means comprising a pair of opposed members operable to close on the opposite sides of said blank in each of said moving die pockets to form said blanks into bars, and means serving to move formed bars out of said die pockets.

7. A device as defined in claim 6 in which means is provided to move said trim means and said die pockets in closed paths which parallel each other in a portion of each, said means comprising a pair of spaced sprockets, track means having two linear portions extending tangentially between corresponding sides of said sprocket and two end return portions adjacent the periphery of said sprockets for guiding said trim means, cam means extending between said sprockets adjacent said linear portions of said track means to move said trim means tangentially from one sprocket to another, and means on one of said sprockets to mount said die pockets for movement radially of the sprocket wherein said pockets may shift from a position in registry with said trim means to a position in registry with said forming means.

8. In a continuously operating machine having a plurality of open-ended moving molds with die pockets therein and further having forming dies operably associated therewith for molding soap bars in the moving die pockets, a means for extruding a strip of unmolded soap to provide a plurality of blanks for soap bars, means for conveying said extruded strips in a lineal path, and means for cutting bar blanks from said strip comprising a backing means for moving along one side of said strip and a plurality of independently driven trimming and conveying boxes for cutting out bar blanks at a point clear of said die pockets and moving said blanks individually adjacent one of the open ends of the moving die pockets, each of said boxes comprising, a body support to be moved in a continuous closed path a portion of which parallels the path of travel of said moving die pockets, a trimmer plunger comprising a piston member having at one end a closed knife formation for moving into said extruded soap, said piston member being mounted for transverse sliding action in said body and a second ejector piston member mounted for sliding motion within said first piston member and having an end surface forming a movable end wall in said closed knife formation for ejecting a bar blank from said closed knife into the open end of one of said die pockets while traveling in said portion of said continuous closed path, a guide means for defining said path for said trimmer boxes, a cam means adjacent said guide means for imparting transverse motion to said piston relative to the motion of said trimmer boxes to cause simultaneous and relative motion of said pistons in said path, a pair of spaced sprockets rotatably mounted within the closed path of said guide means and having means for engaging said trimmer boxes and moving said boxes independently of one another around the periphery of said sprockets, and longitudinally extending cam means for individually propelling said boxes along said guide means between said sprockets in a path substantially tangential to said sprockets while changing the relative spacing between successive boxes.

9. A device as defined in claim 1 in which said sprocket containing said die pockets carries a series of forming plungers disposed circumferentially around said sprocket in a path to register with said die pockets when moved away from registry with said trimmer boxes, means to locate said die pockets positively in registry with said plungers, and means associated with said sprocket for shifting said forming plungers into said die pockets to shape a bar blank therein while said sprocket is moving.

10. A device as defined in claim 9 in which means is associated with said sprocket to move said forming plungers out of said die pockets to carry a formed bar therewith, and means is provided to carry off said formed bar from said sprocket.

11. A device as defined in claim 8 including also a control device comprising a chain disposed adjacent said conveying means for said extruded material, said chain having means for engaging said extruded material in the portions thereof disposed between the subsequently cut bar blanks, said chain being thereby shifted by said material at a rate of speed equal to the speed of said material, and control means associated with said chain means for controlling the speed of said sprockets to synchronize the motion of said sprockets with that of the extruded material.

12. A continuously operating machine for molding soap bars comprising, a feed belt and a discharge belt, a frame, a plurality of pushers arranged in said frame to move in a continuous path therein, a series of connected trim dies arranged to move in a continuous path paralleling the path of the pushers, a series of carrying dies arranged to move in a continuous path, portions of which parallel the path of the trim die in two directions and lie adjacent the trim die, said pushers being adapted to push bars through the trim die into the carrying die and also to push bars out of the carrying die, and a plurality of forming dies mounted for movement in a continuous path which parallels a portion of the path of the carrying dies, means to move said forming dies into said carrying dies from each side to exert forming pressure on bars within the carrying dies, said discharge belt paralleling a portion of the path of the carrying dies downstream from the forming of the bars wherein said discharge belt may receive bars pushed from the carrying die.

13. A device as defined in claim 12 in which the discharge belt is operating in a circuit to reverse the direction of the form bars, and means is provided to receive formed bars from the discharge belt.

14. A continuously operating machine for molding soap bars from raw blanks which comprises, a series of trim dies consisting of a series of apertured plates connected to move in a closed orbit, the apertures of said plates being transverse to the plane of the orbit, a series of pusher elements arranged in spaced relation to register with the apertures in said spaced plates and mounted to move in an orbit paralleling and adjacent the orbit of the trim dies, means to move said pusher elements at predetermined times up to and through the apertures in said trim dies, a plurality of carrying dies also arranged to move in a continuous orbit paralleling a portion of the orbit of said trim dies at spaced points on opposite sides of the orbit, said carrying dies having apertures transverse to the plane of the orbit thereof adapted to register with apertures in the trim dies, said pusher elements being adapted to move trimmed bars from said trim dies to carrying dies at one portion of the orbit, a plurality of forming dies positioned on opposite sides of said carrying dies at a point spaced from said trim dies, means to move said forming dies to said carrying dies from opposite sides thereof and to exert pressure on a trimmed soap bar therein to shape the sides thereof throughout a portion of the orbit of the carrying dies, said pusher elements being adapted to move formed bars from the carrying dies at the second portion of the orbit thereof which parallels the trim dies, and means to receive said formed bars as they are discharged from said carrying dies.

15. A device as defined in claim 14 in which the means to receive the bars comprises, a continuously moving series of pockets traveling in an orbit, means to move shaped bars from said pockets, and means to receive said shaped bars as they are discharged from said pockets.

16. An apparatus for forming and shaping bars of soap which comprises a plurality of open-ended die pockets, means for moving a rough line of soap adjacent said pockets, means for cutting and moving a portion of said soap line into each of said pockets while the pockets are moving, means for carrying said pockets into an arcuate path between and parallel to but radially spaced from pairs of forming dies, means for moving said die pockets radially into a path coincident with said pairs of forming dies, means for moving said forming dies into the open ends of said die pockets with a force to shape said soap by the surfaces of said die pocket and said respective forming dies, means for moving said dies to a position in which the formed bar is outside said die pocket, and means to separate said dies outside said pocket to allow the formed bar to be carried to a discharge point.

17. An apparatus as defined in claim 16 in which the means for carrying the open-ended die pockets in an arcuate path comprises a rotor having mounted thereon a plurality of radial slide tracks, said die pockets being slidably mounted in said tracks, and the means for moving said die pockets radially comprises cam followers affixed to said die pockets and a cam track adjacent the periphery of said rotor to actuate said die pockets radially as said rotor rotates on its axis.

18. A device as defined in claim 16 in which the means for carrying the die pockets and the pairs of forming dies comprises a rotor having a plurality of radial slide tracks thereon for mounting said die pockets, said forming dies being axially mounted in said rotor on either side of said die pockets.

19. An apparatus for forming and shaping bars of soap which comprises a plurality of trimmer boxes, means to move said boxes in a predetermined path, means to move a rough line of soap adjacent the path of said trimmer boxes, means movable in said trimmer boxes to cut and move rough soap bars from said line of soap into said trimmer boxes, a plurality of open-ended die pockets, means for moving said trimmer boxes and said die pockets into a first arcuate path, means to shift said rough soap bars to said die pockets, a plurality of pairs of opposed forming dies, means for moving said forming dies in a second arcuate path parallel to but radially spaced from said first arcuate path, means to shift said die pockets radially to said second arcuate path, and means to move said opposed dies into the open ends of said die pockets with a force to shape said soap against the confining surfaces of said die pockets and said respective forming dies and for moving said forming dies to a position in which the shaped bar is outside said pocket and to separate said forming dies outside said pocket to allow the formed bar to be carried to a discharge point.

20. An apparatus as defined in claim 19 in which the means to move said trimmer boxes and said die pockets comprises spaced rotary sprockets and intermediate cam mechanisms, said trimmer devices being separable so that they are transferred individually from said rotors to said cams and from said cams to said rotors, a plurality of track means on one of said rotors for mounting said die pockets for radial motion on said rotor, the means to shift said die pockets radially comprising a cam and follower mechanism connected to said die pockets, said forming dies being positioned circumferentially around said one rotor lying parallel to the axis thereof to register with said die pockets in one radial position of said pockets.

21. An apparatus as defined in claim 20 in which said forming dies project axially from said rotor, and the cams to move said opposed dies comprises stationary arcuate means positioned on each side of said rotor to provide a cam track and means on said forming dies to serve as followers in said track to cause shifting of said forming dies axially as the dies move with the rotor.

References Cited in the file of this patent

UNITED STATES PATENTS

| | | |
|---|---|---|
| 461,973 | Brown | Oct. 27, 1891 |
| 1,698,852 | Miller et al. | Jan. 15, 1929 |
| 1,981,804 | Jones | Nov. 20, 1934 |
| 2,278,574 | Spohr et al. | Apr. 7, 1942 |
| 2,423,576 | Block | July 8, 1947 |
| 2,688,776 | Evans et al. | Sept. 14, 1954 |
| 2,745,135 | Gora | May 15, 1956 |

FOREIGN PATENTS

| | | |
|---|---|---|
| 557,809 | Great Britain | Dec. 7, 1943 |